(12) United States Patent
Fernandez Berni et al.

(10) Patent No.: US 9,501,712 B2
(45) Date of Patent: Nov. 22, 2016

(54) DEVICE FOR DETECTING EDGES AND IMPROVING THE QUALITY OF AN IMAGE

(71) Applicants: Universidad de Sevilla, Seville (ES); Consejo Superior de Investigaciones Cientificas, Madrid (ES)

(72) Inventors: Jorge Fernandez Berni, Seville (ES); Angel Rodrigez Vazquez, Seville (ES); Ricardo Carmona Galan, Seville (ES)

(73) Assignees: Universidad de Sevilla, Seville (ES); Consejo Superior de Investigaciones Cientificas, Madrid (ES)

( * ) Notice: Subject to any disclaimer, the term of this patent is extended or adjusted under 35 U.S.C. 154(b) by 197 days.

(21) Appl. No.: 14/398,491

(22) PCT Filed: May 3, 2013

(86) PCT No.: PCT/ES2013/000109
§ 371 (c)(1),
(2) Date: Jan. 8, 2015

(87) PCT Pub. No.: WO2013/164499
PCT Pub. Date: Nov. 7, 2013

(65) Prior Publication Data
US 2015/0139553 A1    May 21, 2015

(30) Foreign Application Priority Data

May 3, 2012   (ES) .................................. 201200474

(51) Int. Cl.
*G06K 9/00*     (2006.01)
*G06K 9/46*     (2006.01)
(Continued)

(52) U.S. Cl.
CPC ......... G06K 9/4604 (2013.01); G06K 9/00973 (2013.01); G06K 9/56 (2013.01); G06T 1/20 (2013.01); G06T 5/00 (2013.01); G06T 5/003 (2013.01); G06T 7/0085 (2013.01);
(Continued)

(58) Field of Classification Search
CPC ............ G06K 9/4604; G06K 9/00973; G06T 7/0085; G06T 5/003; H04N 5/378
See application file for complete search history.

(56) References Cited

U.S. PATENT DOCUMENTS

2016/0100116 A1* 4/2016 Mesgarini ............ H04N 5/3745
                                                                      348/300

OTHER PUBLICATIONS

McIlrath, A Low-Power Analog Correlation Processor for Real-Time Camera Alignment and Motion Computation, IEEE Transactions on Circuits and Systems II: Analog and Digital Signal Processing, Dec. 2000, p. 1353-1364, vol. 47, Issue No. 12, IEEE.
(Continued)

*Primary Examiner* — Tony Ko
(74) *Attorney, Agent, or Firm* — Hayes Soloway, P.C.

(57) ABSTRACT

Device for edge detection and quality enhancement in an image which comprises a grouping of identical and locally interconnected elementary processing cells. Each processing cell is characterized in turn by a comparator which carries out in parallel the comparison of each pair of neighboring pixels. The threshold voltage which establishes the difference in voltage between pixels considered to be part of an edge is determined by means of a temporary adjustment of a control signal. This adjustment, along with that of the filtering control signal, also temporary in nature, are the only ones necessary for configuring the required processing. No external analog control signals are required making it easier to program the hardware by the device which is used and reducing the number of digital/analog converters of the final system.

20 Claims, 5 Drawing Sheets

(51) Int. Cl.
　　　*H04N 5/378*　　(2011.01)
　　　*G06T 1/20*　　(2006.01)
　　　*G06T 5/00*　　(2006.01)
　　　*G06T 7/00*　　(2006.01)
　　　*G06K 9/56*　　(2006.01)
(52) U.S. Cl.
　　　CPC ......... *H04N 5/378* (2013.01); *G06T 2200/28* (2013.01); *G06T 2207/20024* (2013.01)

(56) References Cited

OTHER PUBLICATIONS

Schemmel et al, a 66 ×66 pixels edge detection array with digital readout, Proceedings of the 25th European Solid-State Circuits Conference, 1999, p. 298-301, IEEE.

* cited by examiner

DEVICE FOR DETECTING EDGES AND IMPROVING THE QUALITY OF AN IMAGE

The technical field of the invention is microelectronics. The application context is that of very low-power electronic devices which carry out artificial visioning tasks, in other words, image capture, analysis thereof, and action if so required from the results of said analysis.

STATE OF THE PRIOR ART

Edge detection and quality improvement in an image can be carried out in different ways. One option is the use of general purpose digital computation systems. These systems can be programmed to process images. By way of an example, a typical scenario would be software development for image analysis on a PC. This software would execute a series of instructions making use of the corresponding microprocessor until achieving the required result. The main advantage of this approach is the flexibility to tackle any type of task thanks to the all-purpose nature of the underlying hardware. However, this advantage becomes a drawback when the specifications of a particular application require only a restricted set of the functionalities provided by this type of system, but with a much lower power consumption and with similar or much higher levels of performance in terms of the number of operations per second.

The non-specific nature of the hardware is precisely what most frequently prevents said requirements from being fulfilled. The state of the art considers purely digital alternatives for this problem. A first option is to use digital signal processors optimised for the execution of determined operations which are very useful for image processing, such as for example convolution. Another option would be the implementation of processing primitives in reconfigurable integrated circuits such as FPGAs (Field-Programmable Gate Arrays) or CPLDs (Complex Programmable Logic Devices). It is also possible to consider the design of specific digital circuitry for a determined application and to integrate it in a chip. Of the aforementioned, the last option is the one that makes it possible to obtain the highest levels of performance and energy efficiency.

At the same time, the state of the art is familiar with documents which describe the use of mixed signal circuitry (analogue and digital) for processing images, such as patent US2003/0108221. The use of mixed signal circuitry is also described in the publications J. Dubois, D. Ginhac, M. Paindavoine, and B. Heyrman, "*A 10000 FPS CMOS sensor with massively parallel image processing,*" IEEE J. Solid-State Circuits, vol. 43, no. 3, pp. 706-717, 2008; P. Dudek, "*SCAMP-3: A vision chip with SIMD current-mode analogue processor array,*" Focal-plane Sensor-Processor Chips, published by Springer, 2011; Fernandez Berni, R. Carmona Galán and Luis Carranza González, "*FLIP-Q: A QCIF resolution focal-plane array for low-power image processing,*" IEEE J. Solid-State Circuits, vol. 46, no. 3, pp. 669-680, 2011. Most of these patent documents are based on the processing architecture described in patent EP 1580814 which is characterised by a two-dimensional grouping of interconnected elementary processors which work concurrently and jointly to implement a determined operation on an image.

The document by J. Poikonen, M. Laiho, and A. Paasio, "*Anisotropic filtering with a resistive fuse network on the MIPA4k processor array,*" in IEEE International Workshop on Cellular Nanoscale Networks and Their Applications, 2010 makes use of the physics inherent to a network of capacitors interconnected by means of resistances to carry out selective filtering on an image, thus managing to eliminate spatial noise without affecting its contrast. This selective filtering is determined by a comparison circuitry which makes it possible to locate all the edges of the image. Thus, among those pixels labelled as belonging to an edge no filtering is carried out whereas on the rest it is. In addition to the aforementioned improvement in quality, the comparison circuitry also makes it possible to obtain a binary image in which those pixels considered to be edges in the original image are emphasised.

EXPLANATION OF THE INVENTION

The present invention finds its application in very lower power consumption electronic devices designed to carry out artificial visioning tasks. Specifically, the device of the invention makes it possible to detect edges and improve the quality of the image. The device moreover allows for the development of autonomous visioning devices with a very low power consumption. This invention makes it possible to significantly extend the useful life of these devices in scenarios where the maximum possible autonomy is necessary as occurs with the monitoring of natural spaces, robotics, help for unmanned flight navigation, etc.

The device of the present invention uses voltages to represent the pixels, not using currents as occurs in the document of the state of the art J. Poikonen, M. Laiho, and A. Paasio, "*Anisotropic filtering with a resistive fuse network on the MIPA4k processor array,*" in IEEE International Workshop on Cellular Nanoscale Networks and Their Applications, 2010. The comparison between neighbouring pixels which leads to determine whether or not an edge exists is also carried out in voltage mode, not in current mode as in said document of the state of the art.

The key to the invention is the comparator which carries out in parallel the comparison of each pair of neighbouring pixels. On the one part, the threshold voltage which establishes the difference in voltage between pixels considered part of an edge is determined by means of a temporary adjustment of a control signal. This adjustment, along with that of the filtering control signal, also of a temporary nature, are the only ones needed to configure the required processing. External analogue control signals are not required meaning that programming of the hardware by the device used is made easier and the number of digital/analogue converters of the final system is reduced. Furthermore, due to the fact of working in voltage mode and the proposed method of implementation, the energy efficiency of the comparator of the present invention is much greater than that obtained by other implementations known in the state of the art.

The use of mixed signal circuitry makes it possible to exploit to a maximum the physics of the transistors when it comes to processing the electrical signals which represent the values of the pixels of an image, making it possible to achieve better performance figures and power consumption than an equivalent digital implementation. The novel circuitry of the invention makes it possible to achieve a much lower power consumption than any other device until now.

Additionally, an object of the present invention is a method for the hardware detection of edges and quality enhancement of an image by implementing the device described above and which comprises the stages of associating the value of each pixel of the image with the analogue voltage value stored in a capacitor interconnected by means of at least two MOS transistors to the capacitors of its immediate vicinity on the lower row and right hand column, in such a way that the voltage in each one of the neighbouring capacitors represents in turn the pixel corresponding to that spatial position within the distribution; and comparing the local value of the pixel in a programmable manner with the neighbouring pixels by means of voltage comparators with a digital output; and wherein the result of the comparison with each neighbour is combined respectively with a global filtering signal active at logic level '0' through an OR digital gate whose outputs control the transistor gate terminal which interconnects the elementary cells; and wherein the output of the voltage comparators is combined by means of another OR digital gate whose output represents a binary image in which those pixels with logic level '1' determine the location of the edges of the image.

Throughout this description and the claims, the word "comprises" and its variants are not intended to exclude other technical characteristics, additions, components, or steps. For persons skilled in the art, other objects, advantages and characteristics of the invention will be inferred in part from the description and in part from the practice of the invention. The following examples and drawings are provided by way of illustration and are not intended to be limiting of the present invention. Moreover, the present invention covers all possible combinations of particular and preferred embodiments indicated herein.

DETAILED DESCRIPTION OF EMBODIMENTS AND EXAMPLES

Figure 1:
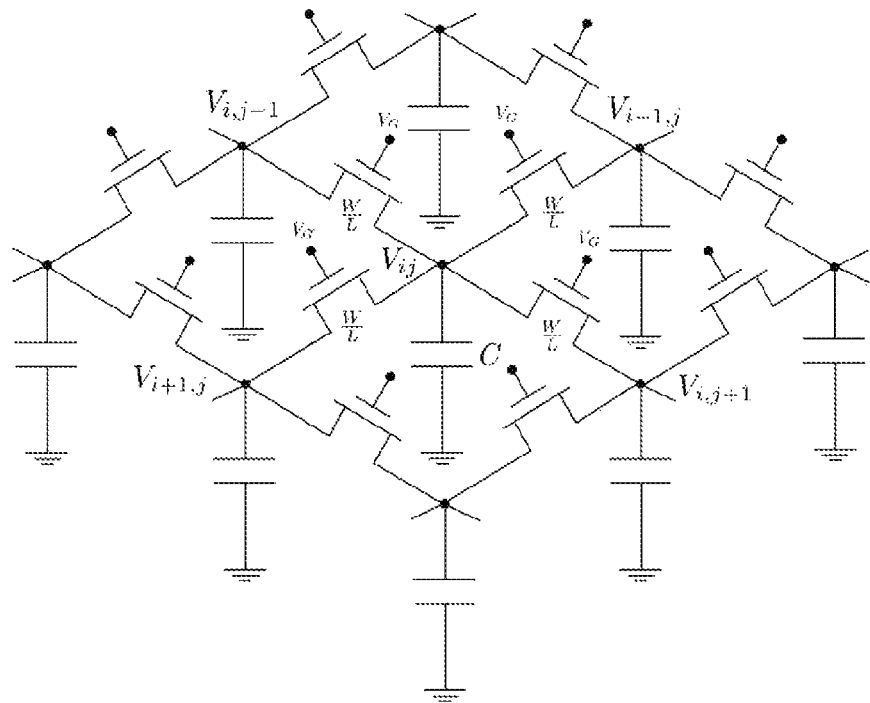
FIG. 1 shows the basic structure of the device of the invention, i.e., a RC network based on MOS transistors

The device of the present invention for edge detection and quality enhancement of an image comprises a hardware structure which is based on a RC network based on MOS transistors wherein each transistor plays the role of a resistor which is activated through its gate voltage. This can be seen in FIG. 1. Each pixel of the image to be processed is represented in an analogue manner by the voltage of a capacitor (1). It is considered that the network of the hardware of the invention is made up of a two-dimensional regular spatial distribution of identical and locally interconnected elementary processing cells. The cells make it possible to detect in a programmable manner edges in an image and to carry out a selective filtering on said image.

Figure 2:
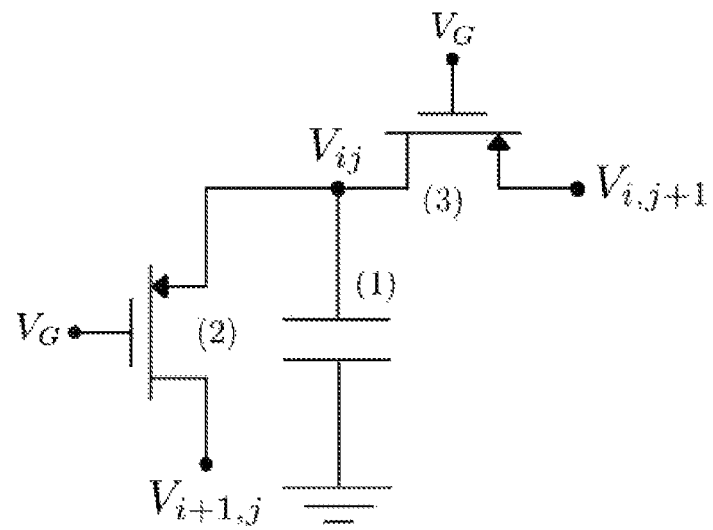
FIG. 2 shows an elementary processing unit of a RC network like the one shown in FIG. 1. Those units situated right above the lower and right edges will not have connectivity to the south and to the east, respectively.
Figure 3:
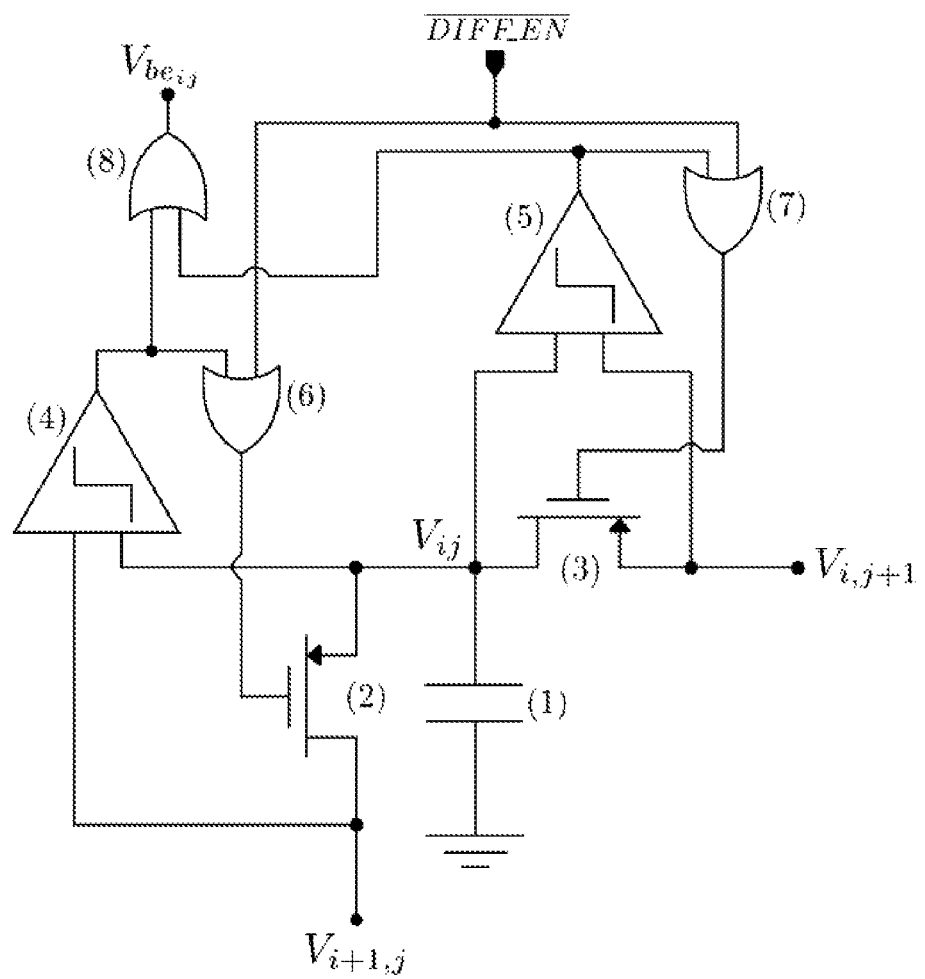
FIG. 3 shows an elementary processing unit of the proposed hardware. It is based on the elementary unit represented in FIG. 2, whereon the added devices, to achieve the functionality that is the object of the present invention, are shown.

Thus the device for edge detection and quality enhancement in an image comprises a mixed signal hardware which is characterised in that it has identical and locally interconnected processing cells. It is also characterised in that it carries out in parallel the comparison of each pair of neighbouring pixels. Each pixel of the image is represented analogically by the voltage value of a capacitor (1), said capacitor (1) being interconnected by means of at least two MOS transistors (2, 3) to the capacitors (1) in its immediate vicinity, which represent the adjoining pixels of the immediately lower row and of the column immediately to the right. This can be appreciated in FIG. 2. The device moreover comprises voltage comparators (4, 5) with digital output which allow for the comparison of the local value of a pixel with the value of its neighbouring pixels, namely the pixel that is in the row immediately below and the pixel that is in the column immediately to the right. The device also comprises at least two OR digital gates (6, 7) which combine the output of said comparison, in other words, the output of each one of the voltage comparators (4, 5), and a global filtering signal active by logic level '0', the outputs of the OR digital gates (6, 7) being connected to the gate terminal of the MOS transistors (2, 3). The device comprises a third OR digital gate (8) which has as its inputs the outputs of the voltage comparators (4, 5) and whose output represents a binary image in which those pixels with logic value '1' are the edges of the image that is being processed and those with a logic value '0' represent the rest of the pixels that are not considered edges. All of these elements are shown in FIG. 3.

Each comparator (4, 5) operates on the voltage of two neighbouring capacitors, activating their filtering through the gate voltage of a transistor (2, 3) that joins them on condition that their difference is less than a certain threshold voltage. Otherwise, the transistor moves into cut-off mode preventing filtering.

Figure 4:
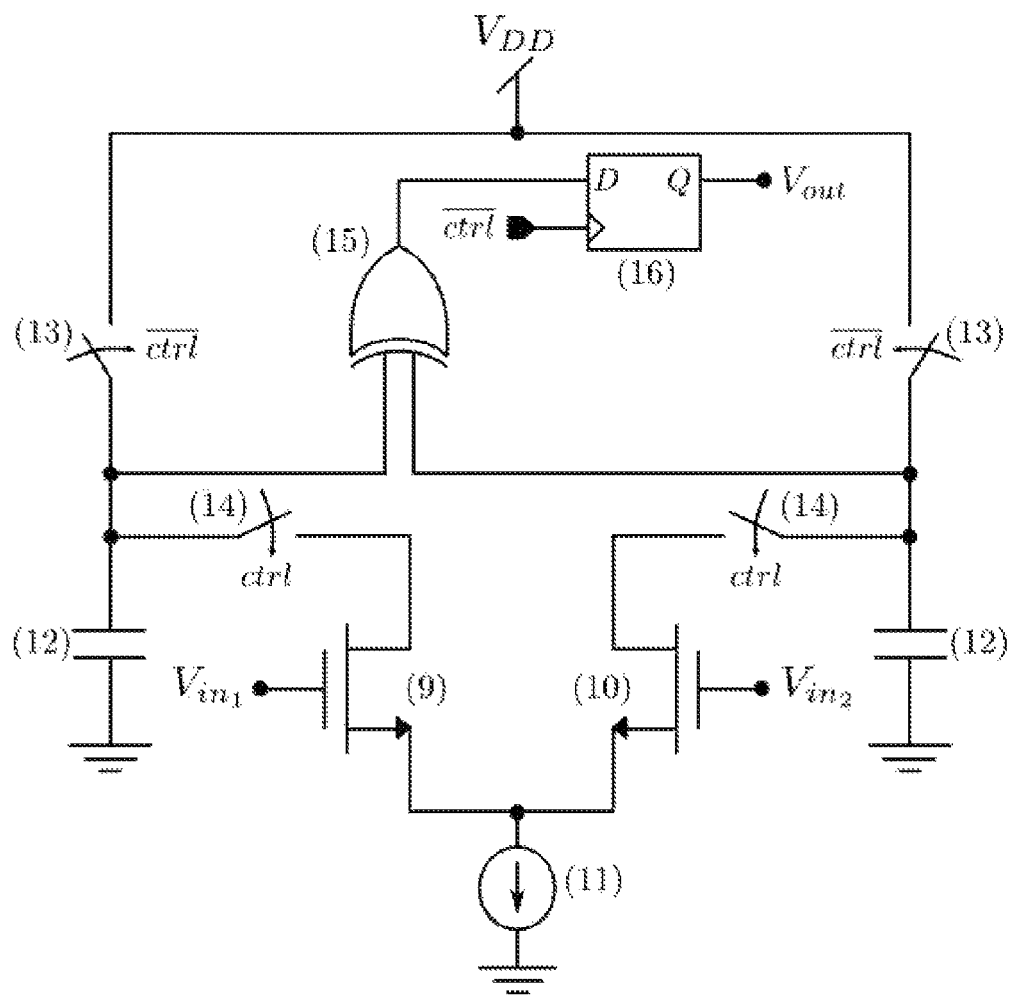
FIG. 4 shows an outline of a comparator comprised in the elementary processing unit represented in FIG. 3.

In a preferred embodiment of the invention, the comparators (4, 5) comprise a differential pair (9, 10, 11) the input of which is determined by the voltages of the pixels to be compared and whose output current is converted to voltage by means of the time-programmable discharge of the capacitors (12) pre-charged at a certain voltage, not as is usually done in the state of the art which is by means of resistances or by means of active loads based on MOS transistors. The discharge time interval determines the threshold voltage of the comparator. Both the pre-charging of the capacitors (12) and their discharging is controlled by means of a single signal which is determined by the open or closed state of the respective switches (13, 14). In FIG. 4, a representation can be observed of the internal circuitry of said comparators.

In one embodiment of the invention, the analogue-digital conversion of the result of the comparison carried out in the comparators (4, 5) is performed by means of a XOR digital gate (15) whose inputs correspond to the final voltages of the capacitors (12) following their pre-charging and subsequent discharging during a programmable time interval. Thus, the temporary adjustment depends on the input threshold voltage of the XOR gate (15) which transforms analogue voltage differences into a digital output signal indicating the result of the comparison.

In another preferred embodiment of the invention, the output of the XOR digital gate is stored in a memory element (16) until the next comparison is carried out. The instant of storage can also be fixed by the control signal of the switches (13, 14).

Additionally, an object of the present invention is a method for hardware edge detection and quality enhancement in an image, implemented in the device described above and which comprises the stages of:
(i) associating the value of each pixel of the image with the analogue voltage value in a capacitor (1) interconnected by means of at least two MOS transistors (2, 3) to the capacitors (1) of its immediate vicinity on the lower row and right column, in such a way that the voltage in each one of the neighbouring capacitors represents in turn the pixel corresponding to that spatial position within the distribution;

(ii) comparing the local value of the pixel in a programmable manner with the neighbouring pixels by means of voltage comparators (4, 5) with digital output; and wherein the result of the comparison with each neighbour is combined respectively with a global filtering signal active by logic level '0' through an OR digital gate (6, 7) whose outputs control the transistor gate terminal which interconnects the MOS transistors (2, 3) of the cells; and wherein the output of the voltage comparators (4, 5) is combined by means of another OR digital gate whose output represents a binary image wherein those pixels with logic level '1' determine the location of the edges of the original image.

In one preferred embodiment of the invention, the comparison comprises a stage of conversion to voltage of the output current of the differential pair (9, 10, 11) of the comparators by means of the time-programmable discharge of capacitors (12) pre-charged at a certain voltage, wherein this discharge time interval determines the threshold voltage of the comparator; and where both the pre-charging of the capacitors (12) and their discharging is controlled by means of a single signal which is determined by the open or closed state of the respective switches (13, 14).

In another embodiment of the invention, the analogue-digital conversion of the result of the comparison is performed by means of a XOR digital gate (15) whose inputs correspond to the final voltages of the capacitors (12) following their pre-charging and subsequent discharging during a programmable time interval. Additionally, the output of the XOR digital gate can be stored in a memory element (16) until the next comparison is carried out. According to another possible embodiment, the instant of storage is also fixed by the control signal of the switches (13, 14).

Example 1

Figure 5A:
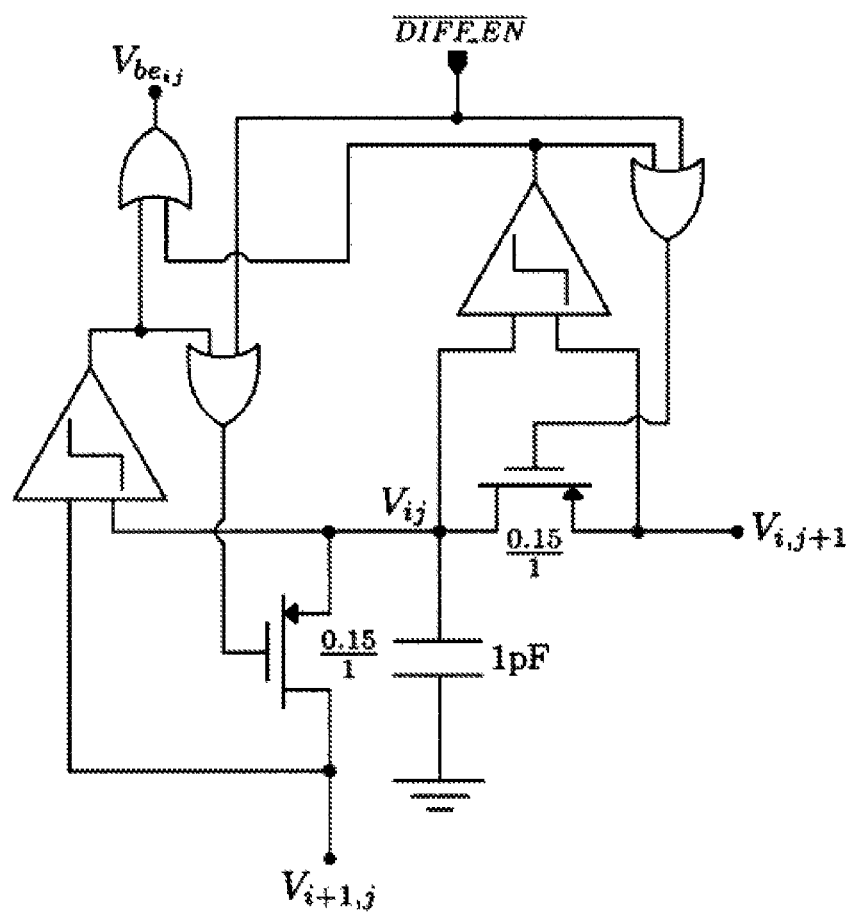
FIG. 5a shows an example of an embodiment of the elementary processing unit of FIG. 3
Figure 5B:
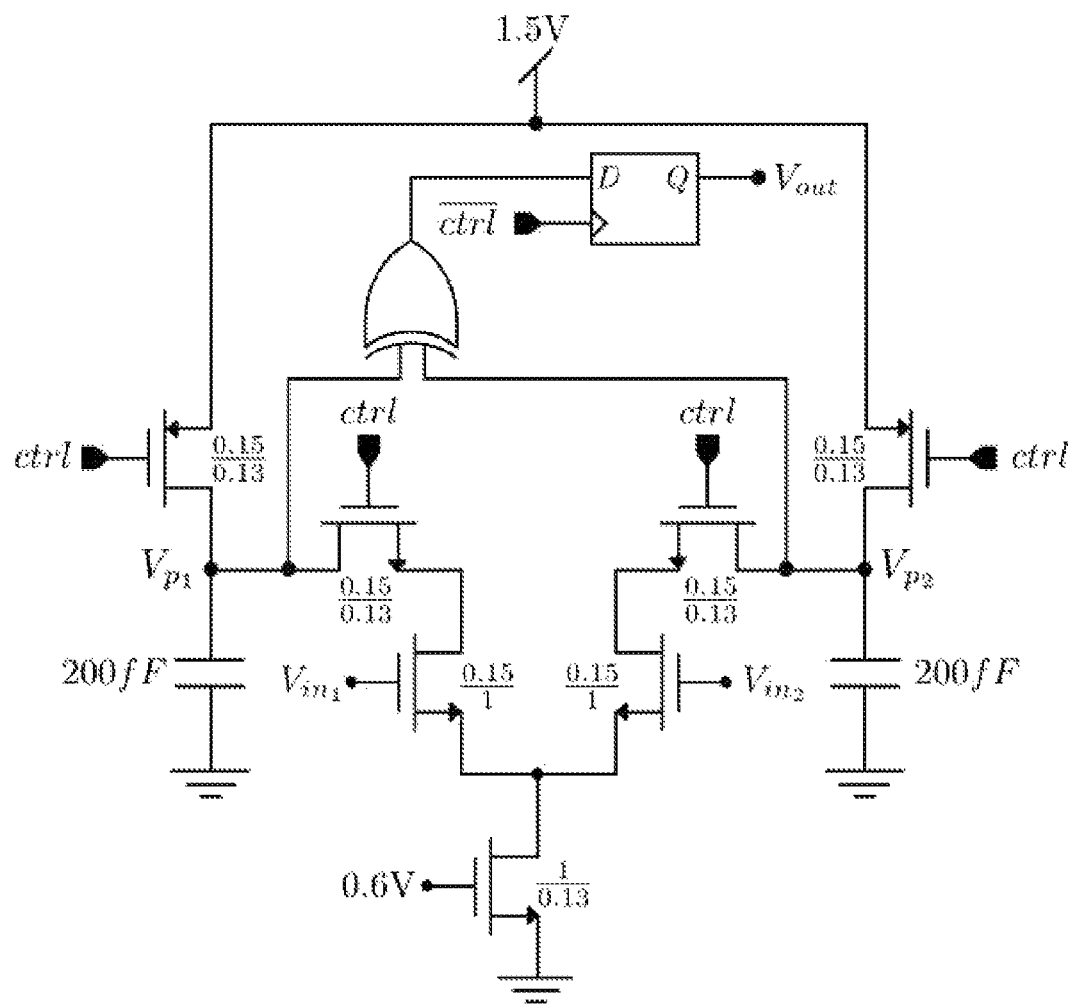
FIG. 5b shows an example of embodiment of the comparator represented in FIG. 4.

FIG. 5 shows an operational example of implementation of both the basic processing cell and its key element, the time-controlled voltage comparator. The design has been made for standard 0.13 µm and 1.5V CMOS technology. FIG. 5 shows the dimensions of each one of the transistors which make up the proposed processing circuitry, along with the value of the capacities, supply voltage and polarisation required.

The dimensions of the elementary MOS resistor and the value of the capacity that make up the RC network lead, in this example, to a time constant of 118 ns. The signal range of the pixels is [0.75V, 1.5V]. The temporary adjustment of the comparator will depend on its threshold voltage, which in turn will depend on how belonging to the edge of an image to be processed is defined, as voltage differences between neighbouring pixels above that threshold voltage will entail the existence of an edge. For this design, after having pre-charged the capacitors to 1.5V fixing the control signal ctrl to logic '0', a subsequent switching of this same signal to logic '1' during 70 ns will lead to a threshold voltage of 0.25V for typical operating conditions in the transistors. To maintain this same threshold voltage in other operating conditions due to variations inherent to the manufacturing process, all that needs to be done is to simply readjust that switching period. Thus, at the extremes of variation in the parameters of the technology, said period will adopt values of 28 ns for corners 'FF' and 'FS' of the design space and of 280 ns for corners 'SF' and 'SS'.

Once the edges are located, represented as a binary image by means of voltages, a selective spatial filtering is applied to achieve the enhancement in the quality of the original image, represented by the voltages of the capacitors of the RC network. By way of an example, a logic '0' is fixed in the DIFF_EN signal, active by low level, during 50 ns. This time interval must also be adjusted according to the variations in the operating conditions of the transistors caused by the manufacturing process. For corners 'FF' and 'SF' of the design space their value would be 44 ns whereas for corners 'FS' and 'SS' it would be 58 ns.

The invention claimed is:

1. A device for edge detection and quality enhancement in an image having pixels, the device comprising a mixed signal hardware comprising a plurality of identical and locally interconnected elementary processing cells, wherein each elementary processing cell comprises:
   a plurality of pixel capacitors, wherein each pixel capacitor has a voltage value for analogically representing a corresponding pixel of the image;
   at least two MOS transistors for interconnecting each pixel capacitor to other pixel capacitors in its immediate vicinity, which represent adjoining pixels corresponding to the lower row and right column, the MOS transistors comprising a gate terminal;
   voltage comparators with digital output for comparing the voltage value representing a pixel with the voltage value representing its neighbouring pixels taking as inputs the voltage value of the pixel under study and the voltage value of one of the adjoining pixels;
   at least two OR digital gates for combining the output of each voltage comparator with a global filtering signal, which is active by logic level '0', wherein the outputs of the OR digital gates are connected with the gate terminal of the MOS-transistors; and
   a third OR digital gate which has as inputs the outputs of the voltage comparators and which additionally has an output representing a binary image which has logic value '1' for the pixels which are edges in the original image and which has logic value '0' for other pixels.

2. The device of claim 1 wherein the comparators comprise:
   differential pair with an input which is determined by the voltages of the pixels to be compared and an output which is an output current;
   discharge capacitors, which are pre-charged at a certain voltage, and having:
      a time-programmable discharge during a discharge time interval for converting the output current to an output voltage; and
      a threshold voltage determined by the discharge time interval;
   and wherein both the pre-charging of the capacitors (12) and their discharging are controlled by means of—a single control signal for controlling both the pre-charging and the discharging of the discharge capacitors; and
   switches connected to each corresponding discharge capacitor, the switches having an open state and a closed state for determining the value of the control signal.

3. The device of claim 2 wherein the elementary processing cells further comprise a XOR digital gate for performing an analogue-digital conversion of the result of the comparison, the XOR digital gate comprising inputs corresponding to voltages of the discharge capacitors after their pre-charging and their subsequent programmable discharging.

4. The device of claim 3, wherein the XOR digital gate has an output, and wherein the elementary processing cell further comprises a memory element for storing the output of the XOR digital gate until a next comparison is to be carried out.

5. The device of claim 4, wherein the single signal is configured so as to determine an instant in which the output of the XOR digital gate is stored in the memory element.

6. The device of claim 2, wherein the XOR digital gate has an output, and wherein the elementary processing cell further comprises a memory element for storing the output of the XOR digital gate until a next comparison is to be carried out.

7. The device of claim 6, wherein the control signal is configured so as to determine an instant in which the output of the XOR digital gate is stored in the memory element.

8. Method for edge detection and quality enhancement in an image having a distribution of pixels, the method comprising the stages of:
  (i) associating each pixel of the image with an analogue voltage value in a pixel capacitor interconnected by means of at least two MOS transistors to other pixel capacitors located in its immediate vicinity at spatial positions corresponding to a lower row and right column, in such a way that the voltage in each one of the pixel capacitors of the immediate vicinity represents in turn the pixel corresponding to that spatial position within the distribution;
  (ii) comparing the voltage value associated to the pixel in a programmable manner with those of the pixels in its immediate vicinity by means of voltage comparators with digital output;
  wherein the result of the comparison with each pixel in the immediate vicinity is combined respectively with a global filtering signal active by logic level '0' through an OR digital gate with outputs which control a transistor gate terminal which interconnects the MOS transistors;
  and wherein the output of the voltage comparators is combined by means of a second OR digital gate which has an output which represents a binary image in which those pixels with logic level '1' determine the location of the borders in the original image.

9. The method of claim 8 wherein, the comparison comprises a stage of conversion to voltage of the output current of a differential pair, wherein the differential pair is comprised in the comparators, as well as the differential pair comprises an input which is determined by the voltages of the pixels to be compared, and an output which is an output current;
  wherein the conversion is carried out by means of a time-programmable discharge, during a discharge time interval, of discharge capacitors, also comprised in the comparators, the discharge capacitor being pre-charged at a certain voltage, wherein the discharge time interval determines a threshold voltage of the comparator;
  and wherein both the pre-charging and the discharging of the discharge capacitors are controlled by means of a single control signal which is determined by an open or closed state of respective switches also comprised in the comparators.

10. The method of claim 9, wherein the output of the XOR digital gate is stored in a memory element until the next comparison is carried out.

11. The method of claim 10, wherein the storage occurs at an instant which is determined by the control signal of the switches.

12. The method of claim 9, wherein the storage occurs at an instant which is determined by the control signal of the switches.

13. The method of claim 9 wherein the digital output of the comparators is obtained from an analogue output by means of an analogue-digital conversion, which is made by means of a XOR digital gate having inputs which correspond to the voltages of the discharge capacitors after their pre-charging and subsequent discharging.

14. The method of claim 13, wherein the output of the XOR digital gate is stored in a memory element until the next comparison is carried out.

15. The method of claim 14, wherein the storage occurs at an instant which is determined by the control signal of the switches.

16. The method of claim 13, wherein the storage occurs at an instant which is determined by the control signal of the switches.

17. The method of claim 8 wherein the digital output of the comparators is obtained from an analogue output by means of an analogue-digital conversion, which is made by means of a XOR digital gate having inputs which correspond to the voltages of the discharge capacitors after their pre-charging and subsequent discharging.

18. The method of claim 17, wherein the storage occurs at an instant which is determined by the control signal of the switches.

19. The method of claim 17, wherein the output of the XOR digital gate is stored in a memory element until the next comparison is carried out.

20. The method of claim 19, wherein the storage occurs at an instant which is determined by the control signal of the switches.

* * * * *